United States Patent Office 3,758,318
Patented Sept. 11, 1973

3,758,318
PRODUCTION OF MULLITE REFRACTORY
Robert E. Farris, Pleasanton, and James C. Hicks, Walnut Creek, Calif., assignors to Kaiser Aluminum & Chemical Corporation, Oakland, Calif.
No Drawing. Filed Mar. 29, 1971, Ser. No. 129,157
Int. Cl. C04b 35/10
U.S. Cl. 106—65      13 Claims

ABSTRACT OF THE DISCLOSURE

Method of making high purity synthetic mullite wherein finely divided aluminous (e.g., aluminum trihydrate) and aluminosilicate (e.g., kaolin clay) raw materials are lightly calcined, at a temperature between 750 and 1150° C., and milled prior to firing to form a mullite refractory. Preferably the milled calcined materials are compacted prior to firing.

BACKGROUND OF THE INVENTION

This invention concerns refractory materials, and more particularly a method of making high purity synthetic mullite refractory.

Mullite has long been known as a desirable refractory material and various methods have been suggested for forming both grain and shaped products comprised predominantly of mullite.

For example, there are naturally occurring bauxitic clays which contain alumina and silica in roughly the necessary proportions, i.e., three moles $Al_2O_3$ to two moles $SiO_2$, to form mullite upon heating to high temperatures. Unfortunately, these naturally occurring materials contain a relatively high percentage of impurities. Although these impurities may assist in the firing of such natural materials to form a dense material, they also tend to impair the refractoriness of the resulting grain or formed product, and may sometimes also impede the formation of mullite, promoting instead the formation of glassy material.

Accordingly, when a high purity mullite product is desired, it is generally necessary to form it by admixing relatively pure raw materials and reacting these to form mullite. For example aluminum hydroxide and silica, or an aluminosilicate such as kaolin clay, can be admixed and fired to form a mullite grain. However, it has proved difficult to secure formation of a high percentage of mullite in these synthetic mixtures. The disadvantage of a low degree of reaction between the alumina and silica is that any silica which does not react with alumina to form mullite tends to form a relatively low melting glass with other components of the system, and accordingly impairs the refractoriness of the resulting product. Also, with materials of relatively high purity, it has proved difficult to reduce the porosity of the fired mullite material to an acceptably low level (e.g., 5% or less by volume).

Various methods have been suggested to overcome this problem of sluggish reaction between high purity materials. For example, very fine grinding of raw materials has been suggested and also high temperature firing to promote reaction. Indeed, it has been suggested to fire the materials several times, together with fine grinding between firings. At best, these prior methods have proved very expensive, and often the resulting product does not have as high a percentage of mullite as desired.

SUMMARY OF THE INVENTION

It has now been discovered, according to this invention, that high purity synthetic mullite refractory can be made from finely divided hydrated aluminous material and hydrated aluminosilicate material if these materials are lightly calcined and then milled prior to firing to form a refractory grain. More specifically, the method according to this invention comprises (a) selecting a finely divided hydrated aluminous material containing, on the ignited basis, at least 95% $Al_2O_3$, substantially all of said aluminous material passing a 325 mesh screen and having an average particle size less than 10 microns, and a finely divided hydrated aluminosilicate material containing, on the ignited basis, at least 95% $Al_2O_3$ plus $SiO_2$, substantially all of said aluminosilicate material passing a 325 mesh screen and having an average particle size less than 5 microns, the amounts of the two materials being chosen so that the two materials together contain, on the ignited basis, from 65 to 80 parts by weight $Al_2O_3$ for each 20 to 35 parts by weight $SiO_2$; (b) lightly calcining said selected materials at a temperature of from 750 to 1150° C.; (c) milling said calcined materials to an average particle size of less than 5 microns; (d) admixing said two selected materials, and (e) firing said milled calcined materials to form a refractory material containing a predominant proportion of mullite and less than 5% material other than $Al_2O_3$ and $SiO_2$.

DETAILED DESCRIPTION

The finely divided hydrated aluminous material can be any such material which contains, after ignition, at least 95%, and preferably 98%, $Al_2O_3$. Substantially all of this material will pass a 325 mesh screen and have an average particle size less than 10 microns, preferably less than 5 microns. The material may be either natural or synthetic, for example aluminum trihydrate $$(Al_2O_3 \cdot 3H_2O)$$

produced by the Bayer process. If the aluminous material does not, in the condition received, have the requisite particle size, it will be understood that it can be ground or milled, for example in a ball mill, to the desired particle size.

The finely divided hydrated aluminosilicate material may be any such material containing, on the ignited basis, at least 95%, preferably 98%, $Al_2O_3$ plus $SiO_2$. Preferred materials are the hydrated aluminosilicates known as clays, most particularly those clays known as kaolins. The aluminosilicate material will be of a size such that all of it passes a 325 mesh screen and it has an average particle size of less than 5 microns, preferably less than 2 microns. Generally such kaolins or other aluminosilicates can be obtained in the requisite degree of subdivision. However, if necessary, this material can be ground, for example by ball milling, either to break up agglomerates of particles, or to reduce the ultimate particle size to the desired fineness.

The aluminous material and aluminosilicate material are selected in proportions so that the ratio of alumina to silica in both materials together approximates the ratio of these two components in mullite, that is to say, the total contains from 65 to 80 parts by weight $Al_2O_3$ for each 20 to 35 parts by weight $SiO_2$. Of course, the most preferred ratio is that of mullite itself, namely 72 parts by weight $Al_2O_3$ for each 28 parts by weight $SiO_2$. Generally, it will be found most practical to admix the two materials prior to the light calcination, but this is not essential. Of course, the two materials must be combined prior to firing.

Admixing of these two materials can be carried out in any suitable equipment, for example in a ball mill, either wet or dry, or in a dry blender.

The light calcining of the materials can likewise be conducted in any suitable equipment, for example a periodic kiln, but for maximum production and efficiency continuous equipment such as a rotary kiln, or multiple hearth roaster will be used.

The milling of the calcined materials also is done in conventional equipment, for example by wet milling in a ball mill or by dry milling in an autogenous or fluid energy mill. A preferred method of milling is by wet milling in a ball mill. The lightly calcined materials are milled to an average particle size of less than 5 microns, preferably less than 2 microns, by which it is meant that at least 50 weight percent of the milled particles have an equivalent diameter less than 5, or less than 2, microns, as the case may be.

Though it is not essential, it has been found that better results are obtained when the lightly calcined admixture is compacted prior to firing. Such compaction can be by briqueting in a roll press, or by nodulizing, or by extruding the wetted admixture. Other methods of compaction can be used. Similarly, if desired, the raw materials can be compacted prior to the light calcination.

Firing can be carried out in any suitable kiln, for example a periodic kiln, but again maximum production and efficiency will be obtained in a continuous kiln such as a rotary kiln or shaft kiln. It has been found that a temperature of at least 1700° C. is generally needed to secure maximum mullitization of the materials and to develop a refractory with optimum microstructure, particularly to form a material with high resistance to creep at elevated temperatures. It will be understood, however, that depending on the precise raw materials used, and the precise manner in which they are processed, other firing temperatures may prove to be optimum.

Mullite refractory grain made according to the present invention shows a higher degree of conversion to mullite, larger mullite crystals, higher density and lower porosity than grain made from similar materials by alternative, prior art methods. Refractory grain made according to this invention can be used in refractory ramming or casting mixes and as aggregate or, after suitable grinding, matrix material for refractory shapes. Such shapes find use as glass tank blocks, checker shapes for blast furnace stoves, kiln furniture, burner blocks, radiant heat combustion tubes, and various other structures where high temperature materials are used. The lightly calcined, milled material of this invention can also be incorporated in a refractory batch consisting essentially of from 60% to 90% by weight of at least one refractory aggregate chosen from the group consisting of alumina and aluminosilicate, and from 10% to 40% by weight of said milled, lightly calcined material as the matrix or ceramic bond forming material for making a fired shape.

EXAMPLE

The raw materials used were aluminum trihydrate produced by the Bayer process and "Ajax P" Georgia kaolin.

As received, the aluminum trihydrate had an average particle size of about 40 microns, substantially all of it being coarser than 2 microns. Its chemical analysis was as follows: 64.8% $Al_2O_3$, 0.4% $Na_2O$, 0.1% CaO, 34.7% ignition loss, together with trace amounts (i.e., less than 0.05% total) of other impurities. One thousand grams of the aluminum trihydrate, slurried in 1,000 grams of water, were milled for 8 hours in a 1 gallon porcelain ball mill filled half full with alumina balls. After this milling, substantially all of the aluminum trihydrate was finer than .20 microns and it had an average particle size of less than 5 microns.

The kaolin, as received, was substantially all finer than 20 microns and had an average particle size of about 1.3 microns. Its chemical analysis was as follows: 38.3% $Al_2O_3$, 45.5% $SiO_2$, 0.5% $Fe_2O_3$, 1.5% $TiO_2$, 0.3% CaO, 0.3% MgO, and 13.6% ignition loss, together with trace amounts (i.e., about 0.05% total) of other impurities.

Fifty-five parts by weight of the aluminum trihydrate and 45 parts by weight of the kaolin were mixed as a slurry by a propeller type mixer. This slurry was dried and the dried cake pulverized in a hammer mill. From the foregoing analyses, it can be calculated that the overall admixture, on the ignited basis, would have the following chemical analysis: 70.6% $Al_2O_3$, 27.4% $SiO_2$, 0.3% $Fe_2O_3$, 0.9% $TiO_2$, 0.3% $Na_2O$, 0.2% MgO, and 0.3% CaO. Thus, it can be seen that the alumina and silica account for 98% of the admixture, and that they are of a weight ratio of 72 parts $Al_2O_3$ to 28 parts $SiO_2$, corresponding to the 3 moles of alumina to 2 moles of silica found in mullite.

The pulverized admixture was placed in 1" deep silica trays which were then placed in an electrically heated furnace at a temperature of 800° C. After the furnace returned to a temperature of 800°, the material was soaked (i.e., held at that temperature) for a period of 1 hour. The lightly calcined material was then wet milled for 8 hours in a 1 gallon porcelain ball mill half filled with alumina balls. Water was used in the proportion of 1,000 grams to 1,000 grams of the lightly calcined admixture. After milling, the material was dried at 105° C., and subsequently blended with 10% water and 2% of a lignosulfonate temporary binder. The wetted admixture was granulated by forcing it through a 20 mesh screen. Pellets ½" in diameter by ½" high were formed from the granulated powder under uniaxial pressure of 20,000 p.s.i. After drying, the formed pellets were sintered at 1750° C. for 20 minutes, being raised to that temperature at 875° C./hr. After firing, the compacts had a bulk density of 3.00 g./cc. Petrographic examination of the fired compacts showed them to comprise about 92 volume percent mullite, about 3 volume percent glass, and about 5 volume percent total pores. The pores were fewer and smaller than those in compacts made the same way except for omission of the light calcination step. The mullite crystals were about one micron in size. No residual alpha alumina was seen.

The specimens of the preceding example are to be compared with similar specimens made from the same raw materials in exactly the same way except that the calcination and subsequent milling steps were omitted. After firing, these comparison specimens had a density of only 2.84 g./cc., and petrographic examination showed that they comprised about 90 volume percent mullite, about 1.5 volume percent glass, and about 8.5 volume percent total pores. The pores were larger than those of the preceding example, being substantially the size of the particles of the original alumina source. It is believed that these relatively large alumina particles, in reacting with surrounding material to form mullite, leave a hole or pore, thus increasing the total porosity. It is believed that the lower porosity of material made according to this invention is due, at least in part, to better dispersion of the alumina source and consequent elimination of this type of porosity. The mullite crystals were about one micron in size. No residual alpha alumina was seen.

While the method of this invention is most useful for making refractory mullite grain, it will be understood that the material and method can be used in other ways, for example for forming the matrix material in a fired alumina or aluminosilicate shape or even to form a mullite shape directly.

In the specification and claims, percentages and parts are by weight unless otherwise indicated, except that porosities are expressed in volume percent. Analyses of mineral components are reported in the usual manner, expressed as simple oxides, e.g., $Al_2O_3$, $SiO_2$, although the components may actually be present in various combinations, e.g., as an aluminosilicate.

What is claimed is:

1. Method of making high purity synthetic mullite refractory material comprising:
   (a) selecting a finely divided hydrated aluminous material containing, on the ignited basis, at least 95% $Al_2O_3$, substantially all of said aluminous material passing a 325 mesh screen and having an average particle size less than 10 microns, and a finely divided hydrated alumino-silicate material containing, on the ignited basis, at least 95% $Al_2O_3$ plus $SiO_2$, substantially all of said aluminosilicate material passing a 325 mesh screen and having an average particle size less than 5 microns, the amounts of the two materials being chosen so that the two materials together contain, on the ignited basis, from 65 to 80 parts by weight $Al_2O_3$ for each 20 to 35 parts by weight $SiO_2$;

(b) lightly calcining said selected materials at a temperature of from 750 to 1150° C.;

(c) milling said calcined materials to an average particle size of less than 5 microns;

(d) admixing said two selected materials, and (e) firing said milled calcined materials to form a refractory material containing a predominant proportion of mullite and less than 5% material other than $Al_2O_3$ and $SiO_2$.

2. A method according to claim 1 wherein the two selected materials together contain about 72 parts by weight $Al_2O_3$ for each 28 parts by weight $SiO_2$.

3. Method according to claim 1 wherein said selected materials are admixed prior to being lightly calcined.

4. Method according to claim 1 wherein said milled calcined materials are admixed and compacted prior to firing.

5. Method according to claim 1 wherein said aluminous and aluminosilicate materials are compacted prior to being lightly calcined.

6. Method according to claim 1 wherein said milling is wet milling in a ball mill.

7. Method according to claim 1 wherein said aluminous material contains at least 98% $Al_2O_3$, said aluminosilicate material contains at least 98% $Al_2O_3$ plus $SiO_2$, and said mullite grain contains no more than 2% by weight material other than $Al_2O_3$ and $SiO_2$.

8. Method according to claim 7 wherein said aluminous material is aluminum trihydrate and said aluminosilicate material is kaolin clay.

9. Method according to claim 1 wherein said aluminous material has an average particle size less than 5 microns and said aluminosilicate material has an average particle size less than 2 microns.

10. Method according to claim 1 wherein said selected materials are milled to an average particle size of less than 2 microns.

11. Method according to claim 1 wherein said firing is carried out at a temperature of at least 1700° C.

12. Method according to claim 3 wherein said aluminous material is aluminum trihydrate containing, on the ignited basis, at least 98% $Al_2O_3$ and having an average particle size less than 5 microns, wherein said aluminosilicate material is kaolin clay containing, on the ignited basis, at least 98% $Al_2O_3$ plus $SiO_2$ and having an average particle size less than 2 microns, wherein said selected materials are admixed prior to being lightly calcined, wherein said admixture contains about 72 parts $Al_2O_3$ for each 28 parts $SiO_2$, wherein said lightly calcined materials are milled to an average particle size of less than 2 microns, wherein said milled lightly calcined admixture is compacted prior to firing, and wherein said firing is carried out at a temperature of at least 1700° C.

13. A method of making high purity synthetic mullite refractory material comprising:

(a) selecting a finely divided hydrated aluminous material containing, on the ignited basis, at least 95% $Al_2O_3$, substantially all of said aluminous material passing a 325 mesh screen and having an average particle size less than 10 microns, and a finely divided hydrated aluminosilicate material containing, on the ignited basis, at least 95% $Al_2O_3$ plus $SiO_2$, substantially all of said aluminosilicate material passing a 325 mesh screen and having an average particle size less than 5 microns, the amounts of the two materials being chosen so that the two materials together contain, on the ignited basis, from 65 to 80 parts by weight $Al_2O_3$ for each 20 to 35 parts by weight $SiO_2$;

(b) admixing said selected materials;

(c) lightly calcining the admixed selected materials at a temperature of from 750 to 1150° C.;

(d) milling said calcined materials to an average particle size of less than 5 microns;

(e) admixing from 10% to 40% by weight of said milled, lightly calcined materials as bonding component with from 60% to 90% by weight of at least one refractory aggregate chosen from the group consisting of alumina and aluminosilicate to form a refractory batch; and (f) firing said refractory batch.

References Cited

UNITED STATES PATENTS

| 2,878,132 | 3/1959 | Bachman et al. | 106—67 |
| 1,802,298 | 4/1931 | Willetts | 106—67 |

JAMES E. POER, Primary Examiner

U.S. Cl. X.R.

106—67